US012420126B1

(12) United States Patent
Broidy et al.

(10) Patent No.: US 12,420,126 B1
(45) Date of Patent: Sep. 23, 2025

(54) FIRE SUPPRESSION SYSTEM

(71) Applicant: Fire & Pump Services Group, Rancho Dominguez, CA (US)

(72) Inventors: Frank Broidy, Carson, CA (US); Brandon Troc, Redondo Beach, CA (US)

(73) Assignee: ACME GROUP, LLC, Carson City, NV (US)

(*) Notice: Subject to any disclaimer, the term of this patent is extended or adjusted under 35 U.S.C. 154(b) by 1175 days.

(21) Appl. No.: 17/184,557

(22) Filed: Feb. 24, 2021

Related U.S. Application Data

(63) Continuation-in-part of application No. 16/926,793, filed on Jul. 13, 2020, now Pat. No. 11,883,700, (Continued)

(51) Int. Cl.
*A62C 35/02* (2006.01)
*A62C 13/76* (2006.01)
(Continued)

(52) U.S. Cl.
CPC ............ *A62C 35/023* (2013.01); *A62C 13/76* (2013.01); *A62C 13/78* (2013.01); *A62C 31/28* (2013.01);
(Continued)

(58) Field of Classification Search
CPC ......... A62C 33/00; A62C 33/04; A62C 31/28; A62C 13/76; A62C 13/78; A62C 35/023;
(Continued)

(56) References Cited

U.S. PATENT DOCUMENTS 2,287,873 A 6/1942 Geertz
3,097,499 A 7/1963 Rodgers et al.
(Continued)

FOREIGN PATENT DOCUMENTS

GB 518717 * 8/1938
WO 2005033567 A1 4/2005

OTHER PUBLICATIONS

Applicant Interview Summary for U.S. Appl. No. 15/183,734, dated May 28, 2019, 3 pages.
(Continued)

*Primary Examiner* — Christopher R Dandridge
(74) *Attorney, Agent, or Firm* — Buchalter, a Professional Corporation

(57) ABSTRACT

The disclosure is directed to a fire suppression system that includes all control components in a single integrated panel. It further contemplates and may include a chamber configured to maintain an interior inert atmosphere and to enclose and establish a nonflammable workspace for a pyrophoric workpiece. A temperature sensor may also be included and mounted proximate the workspace, along with an oxygen concentration sensor configured to detect an interior oxygen concentration of the atmosphere. The system also includes a dispenser configured to discharge an antipyrophoric granular material onto the workpiece responsive to automatic detection proximate the workpiece of at least one of a predetermined temperature and oxygen concentration. In variations, the chamber is configured as a glove box having viewing windows and a plurality of sealed glove ports positioned to enable user manipulation of the workpiece about the workspace.

14 Claims, 8 Drawing Sheets

Related U.S. Application Data which is a continuation of application No. 15/183,734, filed on Jun. 15, 2016, now Pat. No. 10,709,916, which is a continuation of application No. 13/873,143, filed on Apr. 29, 2013, now Pat. No. 9,393,451.

(60) Provisional application No. 63/151,782, filed on Feb. 21, 2021, provisional application No. 62/981,911, filed on Feb. 26, 2020, provisional application No. 61/639,844, filed on Apr. 27, 2012.

(51) Int. Cl.

| | |
|---|---|
| ***A62C 13/78*** | (2006.01) |
| ***A62C 31/28*** | (2006.01) |
| ***A62C 33/00*** | (2006.01) |
| ***A62C 33/04*** | (2006.01) |
| ***A62C 35/20*** | (2006.01) |
| ***A62C 35/58*** | (2006.01) |
| ***A62C 35/68*** | (2006.01) |

(52) U.S. Cl.
CPC .............. *A62C 33/00* (2013.01); *A62C 33/04* (2013.01); *A62C 35/20* (2013.01); *A62C 35/58* (2013.01); *A62C 35/68* (2013.01)

(58) Field of Classification Search
CPC ......... A62C 35/20; A62C 35/58; A62C 35/68; G21F 7/041; B25J 21/02
See application file for complete search history.

(56) References Cited

U.S. PATENT DOCUMENTS

| | | | | |
|---|---|---|---|---|
| 3,878,896 | A | | 4/1975 | White et al. |
| 3,977,474 | A | | 8/1976 | Boegli |
| 4,174,711 | A | | 11/1979 | Laing et al. |
| 4,356,870 | A | | 11/1982 | Gaylord et al. |
| 4,819,732 | A | | 4/1989 | Laumeister |
| 5,061,022 | A | | 10/1991 | Meriwether |
| 5,273,060 | A | * | 12/1993 | Hill, III ........... H01L 21/67051 454/56 |
| 5,560,693 | A | | 10/1996 | Musser |
| 5,808,541 | A | | 9/1998 | Golden |
| 5,850,876 | A | | 12/1998 | Allison et al. |
| 7,264,178 | B1 | | 9/2007 | Hugg |
| 7,775,292 | B1 | | 8/2010 | Romanco |
| 8,230,939 | B1 | | 7/2012 | Renolds |
| 8,973,670 | B2 | | 3/2015 | Enk, Sr. |
| 9,393,451 | B2 | | 7/2016 | Broidy |
| 10,709,916 | B2 | | 7/2020 | Broidy |
| 11,298,573 | B2 | | 4/2022 | Van Der Stokker |
| 11,883,700 | B1 | | 1/2024 | Broidy |
| 2006/0005880 | A1 | | 1/2006 | Baker et al. |
| 2006/0175067 | A1 | | 8/2006 | Cover et al. |
| 2007/0103325 | A1 | | 5/2007 | Wagner |
| 2008/0257566 | A1 | | 10/2008 | Shattuck |
| 2011/0121034 | A1 | | 5/2011 | Swab |
| 2013/0284465 | A1 | | 10/2013 | Broidy |
| 2016/0296777 | A1 | | 10/2016 | Broidy |

OTHER PUBLICATIONS

Applicant Interview Summary for U.S. Appl. No. 15/183,734, dated Oct. 10, 2018, 3 pages.
Examiner Interview Summary for U.S. Appl. No. 16/926,793, dated Jun. 15, 2022, 2 pages.
Final Office Action for U.S. Appl. No. 13/873,143, dated Jul. 9, 2015, 10 pages.
Final Office Action for U.S. Appl. No. 15/183,734, dated Apr. 24, 2018, 13 pages.
Final Office Action for U.S. Appl. No. 15/183,734, dated Aug. 5, 2019, 10 pages.
Non-Final Office Action for U.S. Appl. No. 13/873,143, dated Oct. 3, 2014, 11 pages.
Non-Final Office Action for U.S. Appl. No. 13/873,143, dated Oct. 7, 2015, 7 pages.
Non-Final Office Action for U.S. Appl. No. 15/183,734, dated Aug. 16, 2016, 8 pages.
Non-Final Office Action for U.S. Appl. No. 15/183,734, dated Dec. 17, 2018, 10 pages.
Non-Final Office Action for U.S. Appl. No. 15/183,734, dated Nov. 15, 2016, 6 pages.
Non-Final Office Action for U.S. Appl. No. 15/183,734, dated Oct. 6, 2017, 8 pages.
Non-Final Office Action for U.S. Appl. No. 16/926,793, dated Nov. 18, 2022, 27 pages.
Non-Final Office Action for U.S. Appl. No. 17/736,939, dated Apr. 11, 2024, 17 pages.
Notice of Allowance for U.S. Appl. No. 13/873,143, dated Apr. 12, 2016, 8 pages.
Notice of Allowance for U.S. Appl. No. 15/183,734, dated Mar. 6, 2020, 10 pages.
Notice of Allowance for U.S. Appl. No. 16/926,793, dated Sep. 7, 2023, 6 pages.
Restriction Requirement for U.S. Appl. No. 16/926,793, dated Mar. 29, 2022, 5 pages.

* cited by examiner

FIRE SUPPRESSION SYSTEM

CROSS-REFERENCE TO RELATED APPLICATIONS

This patent application claims the benefit of priority of U.S. Provisional Patent Applications No. 63/151,782 filed Feb. 21, 2021 and No. 62/981,911 filed Feb. 26, 2020, both entitled Fire Suppression System, and is further a continuation-in-part of U.S. patent application Ser. No. 16/926,793 filed Jul. 13, 2020, now U.S. Pat. No. 11,883,700, and Ser. No. 15/183,734 filed Jun. 15, 2016, now U.S. Pat. No. 10,709,916, and Ser. No. 13/873,143 filed Apr. 29, 2013, now U.S. Pat. No. 9,393,451, both entitled "INTEGRATED PANEL FOR FIRE SUPPRESSION SYSTEM," and which both claim the benefit of priority of U.S. Provisional Patent Application No. 61/639,844 of the same title and filed Apr. 27, 2012, each of which is incorporated by reference herein in their entirety.

BACKGROUND

Certain installations require, by statute, code, or for some other reason, that built in fire suppression systems be provided. In some cases, these systems comprise a simple water sprinkler system that is activated via some environmental trigger (e.g. heat, smoke, and the like). In other cases, more complex systems are required that must meet certain standards for performance and must also pass certain standards of construction and installation. In some cases, there may be regulations for any and all equipment, whether related to the fire suppression system or not.

In the prior art, certain complex fire suppression systems have typically been component based, where each component of the system is installed separately and combined with other components to provide the required fire suppression capability. There are a number of disadvantages of such an approach.

In cases where all materials have to be inspected or graded and approved, each separate component must pass the review process prior to installation. This can take a significant amount of time, severely delaying installation of original, new systems, or repair of existing systems. Often the sources of the components in the prior art are obtained from separate, independent companies, adding to the expense and delay of installation.

One particular environment where such prior art systems suffer from severe disadvantages is the nuclear industry. There are strict requirements that each fire suppression system component must meet (e.g. ASME-American Society of Mechanical Engineers, NQA-1—Nuclear Quality Assurance Level 1). With each component being obtained from a different manufacturer and installed by a different team, the man-hours required for installation, maintenance, and repair are multiplied. Any work at a nuclear site must be supervised by a security team. Such component system installations require a large security team working many hours during all installation, testing, and certification processes. This adds overhead, cost, and scheduling complexity to the process.

Even in non-nuclear environments, building and safety codes may require inspection, certification, UL approval, IBC-International Building Code compliance, and/or other conditions to be satisfied prior to installation and operation of the fire suppression system.

FIG. 1 is an example of a prior art component based fire suppression component system 100. The system 100 includes a plurality of tanks 105. These tanks 105 can contain some fluid or gas to be used with the fire suppression system 100. Each tank 105 requires a space in a mounting rack and coupling through piping to the remainder of the system 100.

At some other location a control panel 110, for controlling fluid flows and mixing of water from water tank 130 and the fluid or gas from tanks 105, is installed on a wall proximate to the system 100 or in some other desired or remote location. The component system 100 may also include battery and backup power 115, a FACP-fire alarm control panel 120, and an auxiliary power supply 125. A water tank 130 and water drain 135 is included in the system 100, along with piping 140 and 145 to a manifold 150 that supplies and or includes emitters or nozzles 150 for dispersing the combined gas, fluid, and or water as appropriate for fire suppression operation.

In variations of fire suppression systems, control panels are configured to operate discreet fire suppression components that may be remote from the control panels, and which may be configured to address special purpose and unique types of environments having different requirements, features, and capabilities.

What has been needed for a long time, but which remains unavailable, are new devices and methods for enabling fire suppression systems that are compatible for use in specialized environments and to meet stringent requirements applicable to such unique applications. Such new systems, devices, and methods are needed to overcome the many shortcomings in prior systems and methods employed by old fire suppression systems, and to enable further innovations and new capabilities for the contemplated fire suppression systems and environments and related equipment, methods, and components.

SUMMARY

The disclosure is directed to various types of integrated and special purposes fire suppression systems, and in some arrangements include control components configured in a single integrated panel. This variation of a fire suppression system enables the entire panel to be integrated, assembled, and inspected off-site, and then later and installed, repaired, and or maintained at a different location. In this way, manufacturing and inspection may in some cases be dramatically reduced, such that installation and time spent on site is also reduced.

Where integration and assembly of the panel is performed off-site, typically the inspection and certification authorities and agencies can more quickly complete final qualification. Once assembled and qualified, the integrated system can remain qualified for rapid installation at any future time, which can also enable rapid and easy replacement of faulty systems. Such qualification ready systems can also include modular subsystem qualification such that plug and play capability can be achieved for the contemplated repair and/or replacement maintenance operations.

In variations, the integrated system may include a surrounding cabinet, with lockable doors to restrict access to the interior of the cabinet to qualified personnel. Inside, the cabinet defines a plurality of spaces that are designed to provide safety, component protection and stability, easy operation, and repair, as well as operational containment of component failures to specific compartments, which protects components in other compartments. The design of the system may also be directed to positioning of internal, heavy components to establish a low center of gravity to increase the natural stability of the cabinet, even in the absence of or failure of on-site mounting straps.

The disclosure is also directed to modified arrangements wherein the contemplated system control panel and multi-compartment cabinet are configured to cooperate with physically remote, special purpose fire suppression systems having specialized capabilities and components. In one such variation, a fire suppression system incorporates the contemplated control panel and compartmented cabinet coupled to and configured to remotely control a chamber arranged to maintain an interior inert atmosphere and to enclose and establish a nonflammable workspace for a pyrophoric workpiece.

The chamber also may include a temperature sensor, an oxygen concentration sensor, and other sensors mounted about and or proximate the workspace. The sensors are configured to detect respective parameters, such as a temperature and or an interior oxygen concentration of the atmosphere about and proximate the workspace and or workpiece.

In further exemplary configurations, the inert atmosphere of the chamber is maintained to have an interior pressure that is supplied from a nitrogen source, such that the inert atmosphere has a volumetric oxygen concentration that is maintained to be less than approximately 15%, or less than 16% or so, or more or less.

Further adaptations include a dispenser that is configured to discharge an antipyrophoric material onto the workpiece responsive to automatic detection proximate the workpiece of at least one of a predetermined temperature, an oxygen concentration, and or other environmental, atmospheric, and other desired conditions and parameters. In variations, the oxygen concentration sensor can be calibrated to detect and alert when the predetermined oxygen concentration exceeds 15% proximate the workpiece.

The chamber in some applications may be further modified or configured as a glove box, which includes workspace viewing windows, a plurality of sealed glove ports positioned to enable user manipulation of the workpiece about the workspace, and other preferred features and capabilities.

The disclosure also contemplates arrangements wherein the antipyrophoric material is a granular magnesium oxide sand, which incorporates at least one anticaking agent, and which sand is formed to have a granulometry of between about 4 and about 6 mesh and an angle of repose approximately between 25% and 35%+/−2%, and which is at least approximately 45% magnesium oxide+/−5% or so.

Other variations of the disclosure contemplate applications wherein the granular antipyrophoric material is discharged in a predetermined quantity configured to establish at least one or one or more of (a) a heat sink sufficient to reduce the predetermined temperature proximate the workpiece, (b) an oxygen barrier surrounding the workpiece, and or (c) a gas barrier surrounding the workpiece.

The disclosure is directed to modifications that includes the dispenser incorporating a discharge nozzle, or one or more nozzles, which are configured and positioned to dispense the antipyrophoric material as a granular sand about the workspace, such that the dispensed material covers the workpiece by establishing an exemplary and substantially conical pile having a predetermined height and radius on top of and around the workpiece. Other configurations of the pile may be designed to form other shapes, heights, and radii on top of and around the workpiece, and may be combined with other variations described herein.

Further variations contemplates the system having a cabinet that includes a plurality of environmentally isolated compartments, and a first walled compartment for receiving and mounting a plurality of fire suppression control systems including at least one of electrical components coupled with the temperature and oxygen concentration sensors and the dispenser, and controls for at least one of (a) gas solenoids, (b) high pressure tank nozzles, and (c) a gas emitter coupled to the chamber.

Also contemplated in this exemplary configuration is a second walled compartment that contained high pressure gas components and including solenoid and actuator systems, and which is configured to isolate gas therein by a sealing mechanism disposed in an opening between the first and second walled compartments. Here too, the gas emitter control may be further configured to connect with and control a high velocity, low pressure emitter configured to communicate gas to and maintain the pressure in the chamber. In other modifications, a plurality of doors each may be included and may incorporate seals configured to environmentally isolate each compartment from the others, when the doors are closed, and from an exterior environment.

This summary of the implementations and configurations of the elements, components, and constituents of the contemplated fire suppression systems and methods of operation introduces a selection of exemplary implementations, configurations, and arrangements, in simplified and less technically detailed arrangements. Such are further explained in more detail below in the detailed description in connection with the accompanying illustrations and drawings, and the claims that follow.

This summary is not intended to identify key features or essential features of the claimed fire suppression system technology, and it is not intended to be used as an aid in determining the scope of the claimed subject matter. The features, functions, capabilities, and advantages discussed here may be achieved independently in various example implementations or may be combined in yet other example arrangements, as further described elsewhere herein, and which may also be understood by those skilled and knowledgeable in the relevant fields of technology, with reference to the following description and drawings.

BRIEF DESCRIPTION OF THE DRAWINGS

An understanding of example implementations of the present disclosure may be derived by referring to the detailed description and claims when considered with the following figures, wherein like reference numbers refer to similar or identical elements throughout the figures. The figures and annotations thereon are provided to facilitate understanding of the disclosure but not for purposes of limiting the breadth, scope, scale, or applicability of the disclosure. The drawings are not made to scale, but are instead arranged to schematically and functionally illustrate various aspects of the disclosure.

DETAILED DESCRIPTION

Figure 1:
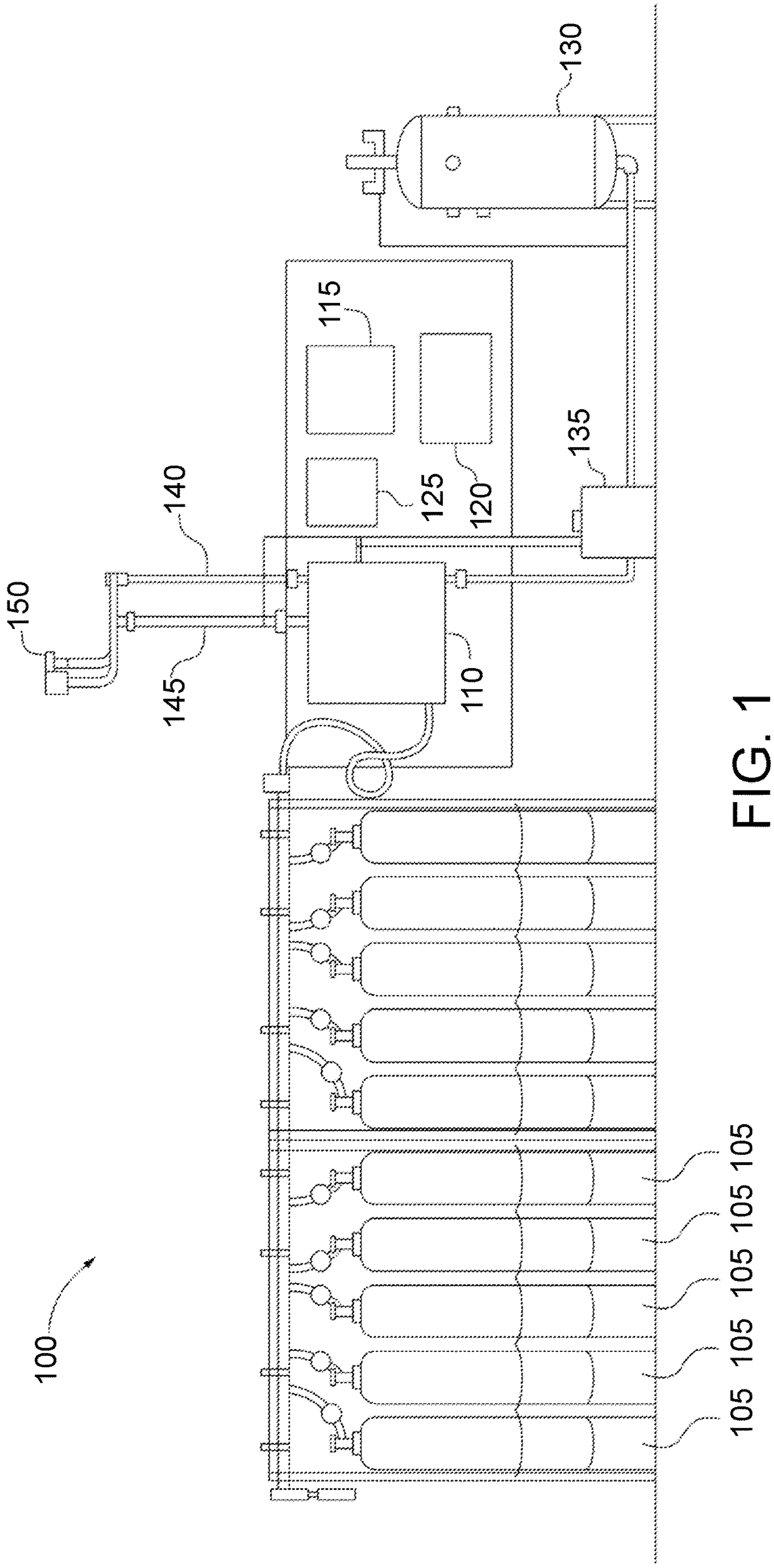
FIG. 1 is an example of a prior art system.

Detailed embodiments of the present invention are disclosed herein, and it is to be understood that the disclosed embodiments, adaptations, arrangements, variations, and modifications are merely exemplary illustrations of the disclosure that may also be embodied in other various and alternative forms. The figures are not necessarily to scale, and some features may be exaggerated or minimized, added, removed, and rearranged to show details of particular components. Therefore, specific structural and functional details disclosed herein are not to be interpreted as limiting, but merely as a representative and exemplary basis for teaching one skilled in the art to variously employ the features, capabilities, and elements of the disclosure.

As those of ordinary skill in the relevant fields of technology should understand, exemplary features, components, and methods of operation illustrated and described with reference to any one of the figures may be combined with those illustrated in one or more other figures to enable configurations that may not otherwise be explicitly illustrated or described. The combinations of features described and illustrated herein are representative arrangements for typical applications. Various combinations and modifications of the features consistent with the teachings of this disclosure are achievable for particular applications or implementations, and are intended to be readily within the ordinary knowledge, skill, and ability of those working in the relevant fields of art and technology contemplated by this disclosure.

The following detailed description is exemplary and is not intended to limit the disclosure, the claims, or the demonstrative implementations and contemplated uses of the present disclosure. Descriptions of specific devices, components, techniques, and applications for use and operation are provided only as examples for purposes of enabling the skilled person to comprehend the disclosure. Modifications to the examples described herein should be readily apparent to those of ordinary skill in the art, and the general aspects and principles depicted herein may be applied to other configurations, variations, and arrangements without departing from the spirit and scope of the disclosure.

Furthermore, there is no intention to be bound by any expressed or implied theory presented or perceived, in the preceding descriptions of the field of technology, background, summary, or the following detailed description. The present disclosure should be accorded scope consistent with the claims, and not be limited only to the examples described and shown herein.

Conventional techniques and components related to use during operation, and other functional aspects of the systems of the disclosure (and the individual operating components of the systems), may be described herein only with enough technical detail so as to enable those with ordinary skill in the relevant technical fields to practice the contemplated implementations of this disclosure.

In addition, those skilled in the art should be able to understand that example implementations of the present disclosure may be practiced in conjunction with a variety of mechanical, electrical, electromechanical, pneumatic, pneudraulic, hydraulic, fluid, gas, and related combinations, and components, and systems. All such components may be controlled, managed, monitored, and rendered operational with a variety of hardware and software processors and computers, and related digital and analog equipment, components, software, firmware, and networked, world-wide-web-based, internet-based, and cloud-based configurations of the described fire suppression systems of this disclosure, which may further incorporate various combinations of such implementations.

Figure 2:
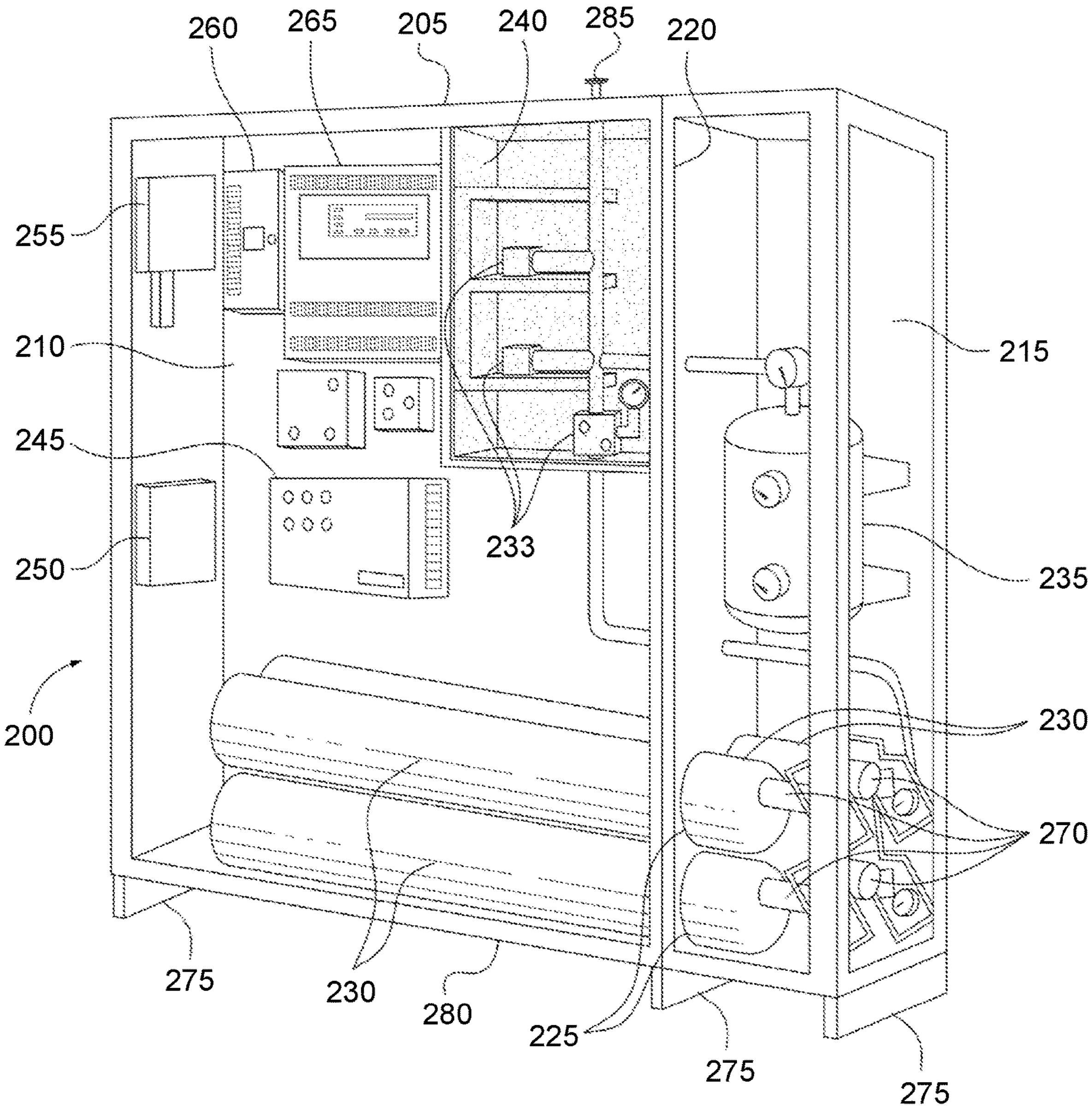
FIG. 2 describes various aspects the new fire suppression system of the disclosure with certain structure removed for illustration purposes.
Figure 3:
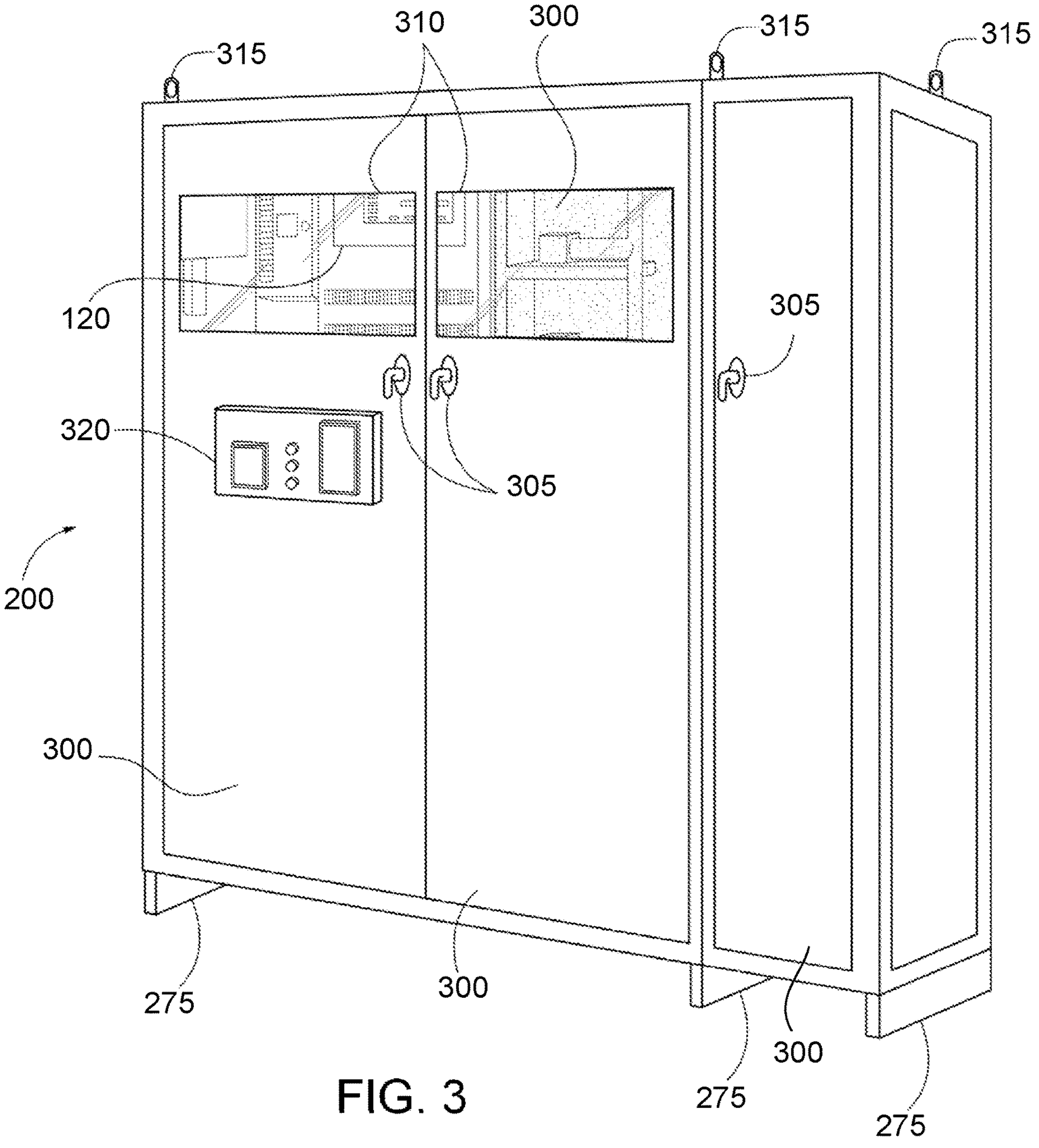
FIG. 3 shows additional aspects of the system of FIG. 2 with various elements rearranged and added for further purposes of illustration.
Figure 4:
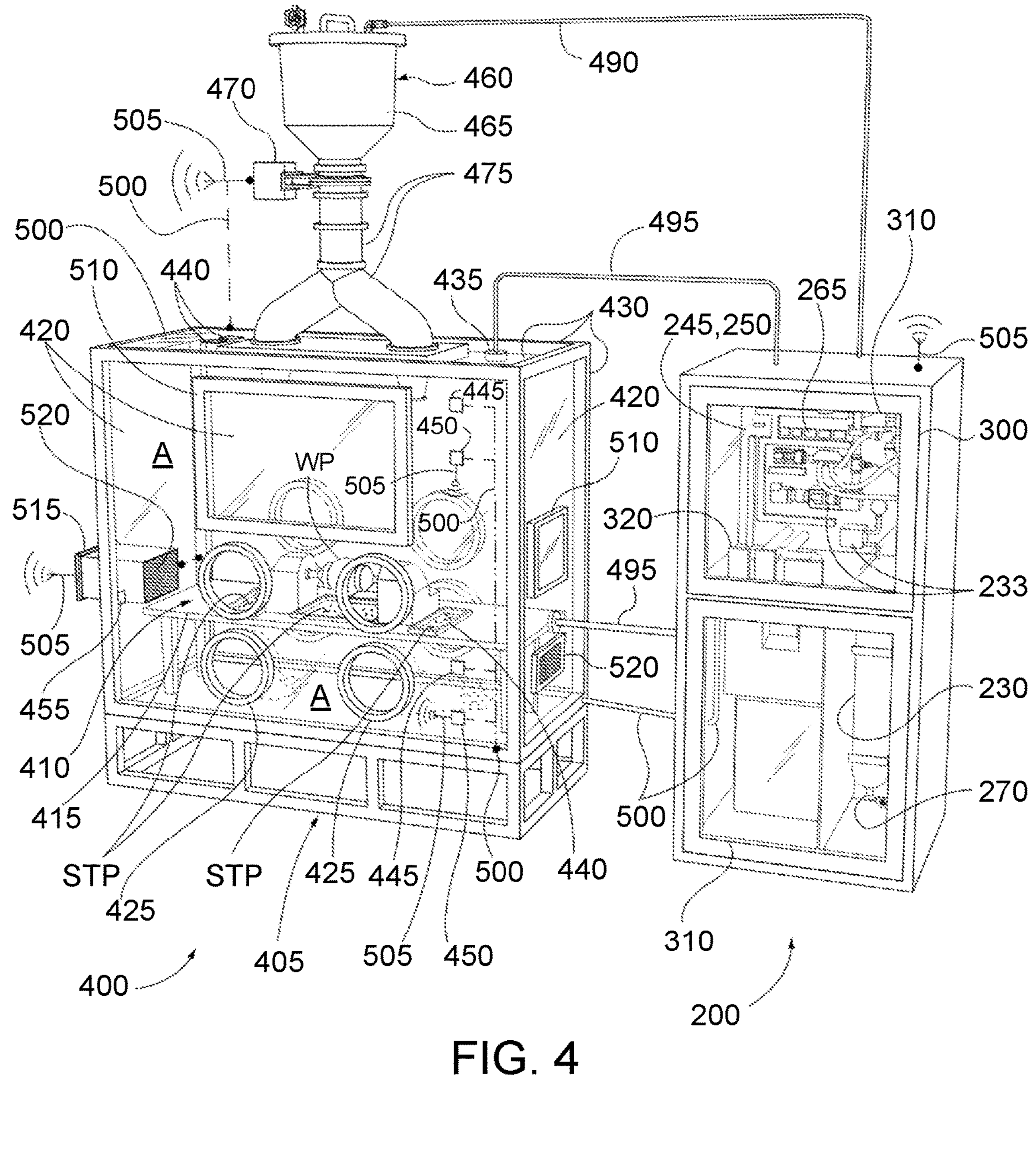
FIG. 4 depicts further aspects of the disclosure and system of the preceding figures.

With reference now to the various figures and illustrations and specifically to FIGS. 2, 3, and 4, an improved fire suppression system 200 includes a unitized, compact, modular scalable set of cabinetry for containing fire suppression system equipment. An example of an embodiment of the system 200 is illustrated in FIG. 2, and includes a cabinet 205 that is substantially rectangular and comprises a plurality of separate and sealable compartments such as compartments 210, 215, and 240 for receiving and isolating various components of the fire suppression system 200. More compartments can be provided without departing from the scope and spirit of the system. The cabinet includes feet 275 that lift the bottom 280 of the cabinet above ground level to protect the interior from external fluid leaks, dirt, dust, and other foreign substances after installation. The example of FIG. 2 is shown without doors and with a side panel removed to illustrate the interior configuration of the cabinet.

In one configuration, the cabinet 205 is comprised of steel with welded seams to provide and establish environmental isolation of the interior components contained in each of separate compartments 210, 215, 240. The cabinet 205 may be a UL approved cabinet for containing electronic components. The cabinet 205 in one embodiment includes the first compartment 210 or section to have exemplary dimensions of about 72 inches in height, 96 inches in width, and 34 inches in depth. The second compartment 215 or section may be 72 inches in height, 24 inches in width or wider, and 24 inches in depth. The compartments or sections are scalable to other comparable dimensions.

The design of the cabinet 205 serves a number of functions. One function is to isolate and contain fire suppression equipment in a single integrated location across the various, individually isolated compartments 210, 215, 240. This allows the system to be assembled and certified off site, and then moved to the installation site while retaining all or most of the certification qualifications, thus reducing installation time and cost. Another function is to reduce the impact of various system failures from impacting the remainder of the system, to thereby minimize cross over damage to components in other compartments. Another function is to allow for easy maintenance and repair of the system with modularized subsystem replacement capabilities after installation.

The separation of components and regions of cabinet 205 into compartments 210, 215, 240 adds to the effectiveness of cabinet 205. Compartments 210 and 215 provide locations for various subsystems of the fire suppression system 200. Further, compartments 210 and 215 are separated by a wall 220 that includes openings 225 for the heads of the high pressure gas tanks 230 to extend into region 215. This unique design separates potential fluid leaks of the water tank 235 and/or nozzles 270 from sensitive instruments and controllers in compartment or region 210. Should the nozzles 270 on the gas tanks 230 fail, and/or should the water tank 235 leak, the fluid will be isolated and contained in region 215, protecting other equipment elsewhere in cabinet 205.

The openings 225 that receive the tops of tanks 230, which tops extend into compartment or region 215, can include gasket, grommets, and/or other sealing mechanisms to provide isolation between the compartments 210 and 2155. The gas tanks 230 may be nitrogen tanks for use in a water/nitrogen and nitrogen only fire suppression systems, but are also compatible for use with other inerting gases or chemicals, and combinations thereof.

Another advantage of the design of the cabinet 205 is natural stability arising from a lowered center of gravity. Cabinet 205 is designed to arrange for heavier components, such as the large and heavy gas cylinder tanks 230, the heaviest components contained in cabinet 205, to be positioned horizontally at the bottom of cabinet 205, which is a naturally more stable configuration and arrangement of the cylinder tanks 230. In contrast to the vertically arranged tanks 101 of FIG. 1, for example, gas tanks 230 are located in a more stable, horizontal arrangement.

In the event of an impact upon cabinet 205, or other external force such as an earthquake, the heavy gas tanks 230 are already aligned horizontally at their lowest possible center of gravity configuration. In this arrangement, the tanks 230 provide overall anchoring and stability to the cabinet 205. Even so, it is possible in some configurations and applications to have gas tanks 230 installed vertically upright, whereby the stability advantages may be lessened.

The fire suppression system 200 of FIG. 2 also includes valves and solenoids 233 contained within third compartment or section 240, which is defined by surrounding walls and a sealable door enclosing the region. The components contained and located in compartment 240 may give rise to potential leaks, such that establishing environmental isolation protects nearby electrical components contained outside compartment 240 and compartment 210.

In one variation, third compartment 240 or section is located entirely within compartment 210 to isolate the fluid and or gas related components. In another modification, compartment or enclosure 215 contains a control system for an emitter based system such as the Vortex system manufactured by Victaulic. Such systems provide an inert gas only and or a water-sparse, inert gas rich solution for fire suppression, and is compatible for use with a high velocity, low pressure discharge emitter, such as for example emitter(s) 285, one or more of which may be mounted on and or carried from cabinet 205 for stand-alone applications. These aspect of fire suppression system 200 may be implemented with any of various off-the-shelf components.

Electrical control components 245, 250, 255, 260, and FACP-fire alarm control panel 265 are also located in cabinet 205, within compartment or region 210, and mounted securely and configured per IBC—International Building Code or ASME-American Society of Mechanical Engineers NQA-1-Nuclear Quality Assurance (NQA-1) requirements. Installation, connection, and certification and qualification of these components are pre-established during manufacturing of cabinet 205. In variations, FACP 265 communicates with the remainder of the components of system 200, as well as with external fire suppression components and systems, through a minimum of connection points, such as via wired and wireless network connections.

For example, fire suppression system 200 includes a power interconnect, plumbing interconnect for integration with the fire suppression piping system, and a communications port(s) (in addition to available wireless control as desired) and a BACnet gateway (see, e.g., www.bacnet.org). These interconnects may be at the top, sides, and/or back of the cabinet 205 as desired. In certain configurations, the connections are pre-arranged and situated during off-site manufacturing of cabinet 205, to be easily accessible and quickly connected during on-site installation, operation, and maintenance of the system 200.

In exemplary arrangements, the plumbing fittings of cabinet 205 connect to a piping gas and or gas/water manifold and or pipe supply system that supplies a remote fire suppression subsystem, sprinkler system, and similar systems and subsystem, which may include nozzles 270 that may be distributed throughout a protected fire suppression space. In another configuration, cabinet 205 will include and mount one or more two-phase fluid nozzles or emitters 285 mounted on top of cabinet 205, without the need for additional piping and plumbing, wherein cabinet 205 is self-contained and no additional piping is required. In other variations, system 200 may also enable and establish combinations of such exemplary arrangements. Cabinet 205 may be configured for wired and wireless communication with various proximate and remote sensors, so as to enable remote activation of fire suppression capabilities upon detection of an alarm condition by the contemplated sensors.

With continued reference to FIG. 2 and now also to FIG. 3, further variations contemplates cabinet 205 including sealable doors 300 configured to environmentally seal compartments 210, 215, 240 to further protect components located in the compartments 210, 215, 240. Doors 300 may include windows 310 to enable visual monitoring of interior components such as FACP 265 and other components without compromising the environmental protection established by doors 300. Doors 300 may also incorporate one or more electronic dashboards or other displays 320 to indicate system status without the need to open doors 300. Variations of doors 300 incorporate three-point locking handles 305 (e.g. T-handles). Doors 300 include gaskets and seals to provide additional environmental isolation of the interior of cabinet 205.

Cabinet 205 may also include integrated mounting eyes 315 for mounting and stabilizing cabinet 205 against a wall or other structure. Other mounting locations can be integrated about cabinet 205. The system is scalable, and it is contemplated that additional cabinets and compartments can be attached and integrated into the system as needed, both at the assembly location or the installation location.

Figure 5:
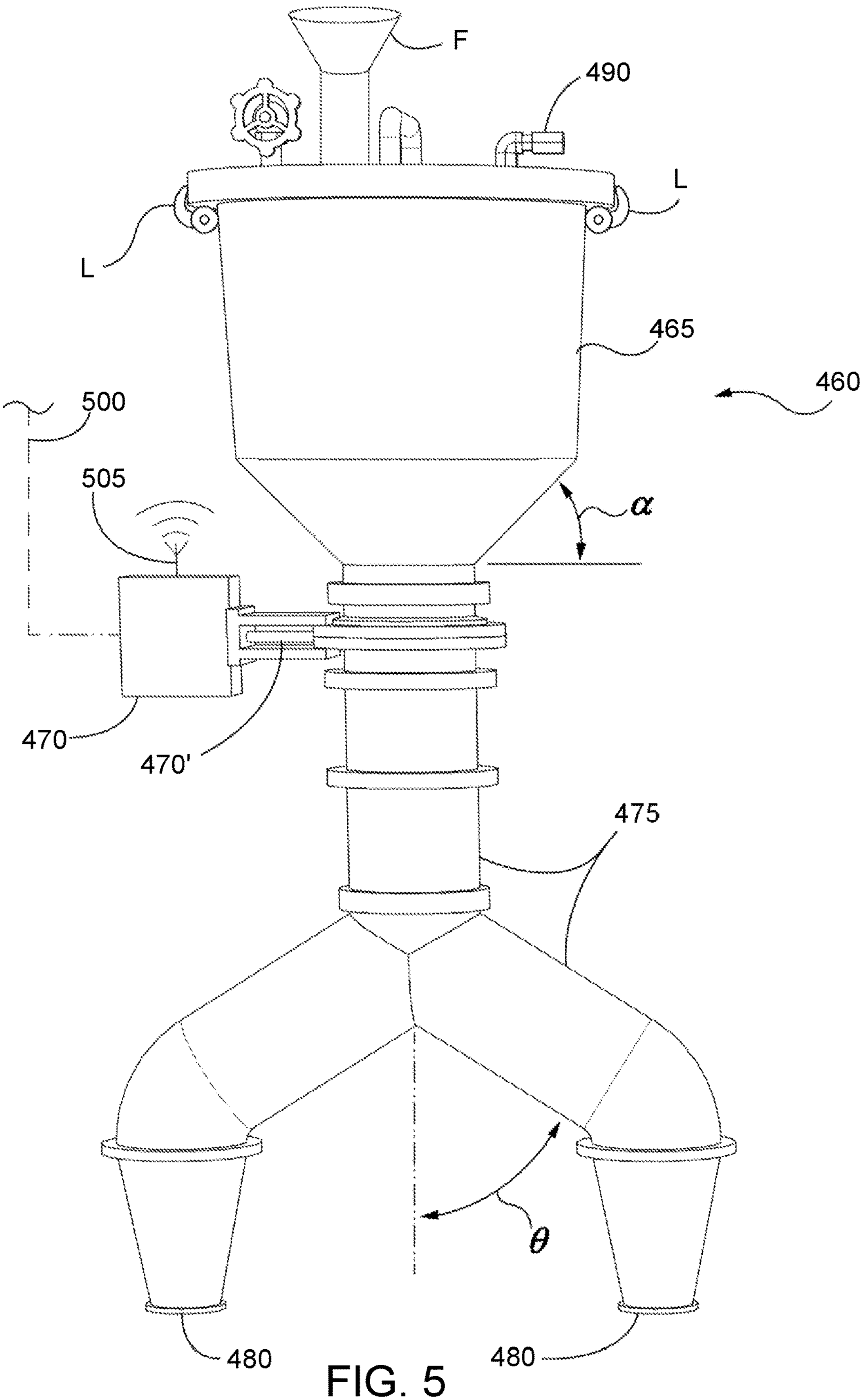
FIG. 5 illustrates aspects of specific components of the system of the disclosure and FIG. 4 in modified scale and with certain structure removed for purposes of illustration.
Figure 6:
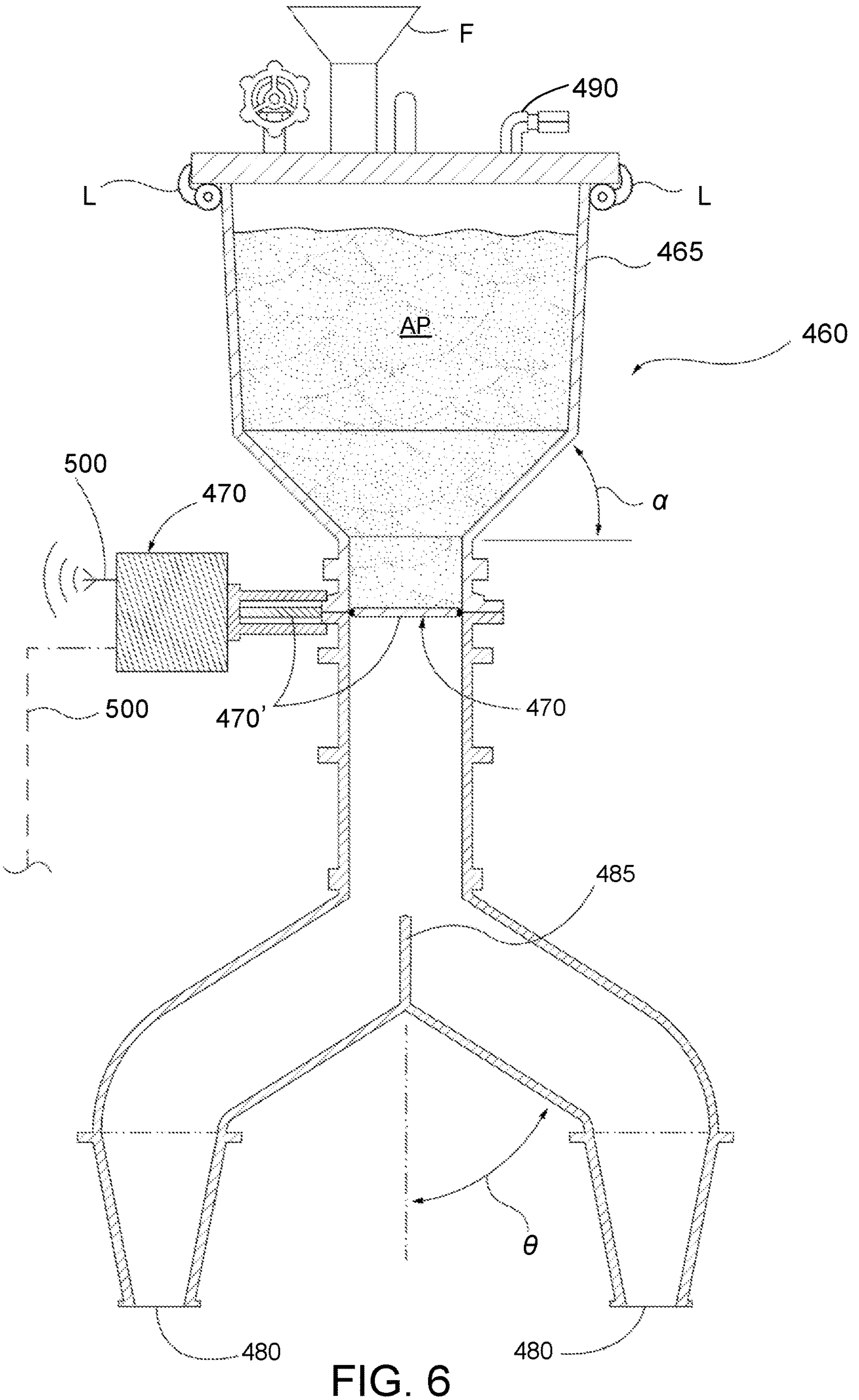
FIG. 6 is a cross-sectional view in modified scale of components of FIG. 5, with certain structure removed for added illustration purposes.

With reference now also to FIGS. 4, 5, and 6, fire suppression system 200 also contemplates modified configurations having FACP control panel 265 and multi-compartment cabinet 205 configured to form a part of, be integrated with, and or to cooperate with physically remote, special purpose fire suppression systems, such as fire suppression subsystem 400. In any such configuration, fire suppression subsystem is configured to have and incorporates specialized capabilities and components.

In exemplary arrangements of the disclosure, fire suppression system and or subsystem 400 is integrated with, coupled to, and or electronically in communication with the contemplated control panel 265 and compartmented cabinet 205 and other components thereof, which are configured to remotely cooperate with and or control a special purpose chamber 405, incorporated as part of fire suppression subsystem 400, and or system 200. In other words, although depicted in the various figures as separate units, system 200 and subsystem 400 of FIG. 4 and other figures may be integrated in various ways as a single unit, in alternative and optionally preferred arrangements.

Chamber 405 is configured to establish and to environmentally seal and enclose a nonflammable workspace 410 for a pyrophoric workpiece WP, wherein the workspace 410 is located within the interior of chamber 405, and fully bathed in the contemplated inert atmosphere, and otherwise constructed of materials such as a table and machinery to render workspace 410 nonflammable. Depending upon a desired application and various operational considerations, workspace 410 may include a work surface 415 such as a work bench or table top, which may support and or include a machine or machines and tools that may be utilized to form, modify, machine, and alter the contemplated pyrophoric workpiece WP that is also placed about work surface 415. Such contemplated work surfaces 415 may further include various receptacles or trays that may capture shavings, tailings, turnings, and particulates STP generated during manipulation, manufacturing of, and operations performed upon workpiece WP.

Further variations of chamber 405 contemplate applications and modifications directed to configuration as a glove box, as depicted in exemplary form in FIG. 4, and other figures. Some such glove box arrangements are configured to be atmospherically sealed, and to include polymeric gloves mounts in ports about the glove box to enable users and operators to manipulate objects within the glove box 405, while remaining protected from undesirable contact therewith. Here, the exemplary arrangement contemplates such a glove-box type chamber 405 example as including viewing windows 420 that enable user visualization of workspace 410 and work surface 415, a plurality of sealed glove ports 425 positioned to enable user manipulation of workpiece WP about workspace 410 and work surface 415, and other preferred features and capabilities.

In FIG. 4, gloves are not shown and are removed from most ports 425 for purposes of illustration, and are shown in some ports extending interiorly into chamber 405, and in dashed lines to enable visibility of other aspects of the interior of chamber 405. The disclosure also depicts in the various figures glove ports 425 on other sides of chamber 405, sometimes in dashed lines to enable illustration of other features of chamber 405. The disclosure contemplates use of polymeric gloves in all ports to enable users and operators to manipulate items, including for example workpiece WP and tools and machinery nearby, within chamber 405, during operation.

In variations, chamber 405 in such a glove-box arrangement may incorporate enclosure walls 430 formed from a transparent material, such as a tempered glass, to further improve visibility of the interior. Modified configurations of chamber 405 may incorporate various aspects and components of system 200 including for example without limitation, integrated cabinet 205 and its various compartment, components, and capabilities, which can be integrated as part of chamber 405 about exterior portions or in other arrangements as may be desirable.

In alternatively preferred configurations, chamber 405 establishes and maintains an interior inert atmosphere A about environmentally isolated and enclosed nonflammable workspace 410. The inert atmosphere A of the chamber is maintained to have an interior predetermined pressure, which is controlled by one or more of subsystem 400 and or system 200, and which is supplied by a nitrogen source, such as gas cylinder tanks 230, and or another similar source. Chamber 405 includes one or more high velocity, low pressure emitters 435 about various locations and in fluid communication with the interior atmosphere A.

In this arrangement, the inert atmosphere A is pressurized with an inert gas, such as nitrogen that may change according to application requirements, which is controlled and configured to have a volumetric oxygen concentration that is maintained to be equal to and or less than approximately 16%, or equal to or less than 15% or lower, or in other adaptations more or less or higher or lower. During initial loading of workpiece WP into chamber 405, via an access window AW or another portal, chamber 405 may be evacuated of ambient air, and charged with an inert atmosphere, such as a nitrogen, or may be gradually adjusted to adjust the relative oxygen concentration by pressurization with a nitrogen source as described. While the contemplated pressurization may be higher or lower than an ambient external atmosphere, it is sometime desirable to maintain an interior pressure within chamber 405 to prevent contamination of the interior atmosphere with outside air. This can be especially important when it is desired to maintain an interior atmosphere A that has less oxygen, moisture, and other constituents, than that found in ambient external air.

Chamber 405 may in further variations include various types of sensors and components, which for example may include a temperature sensors 440, oxygen concentration sensors 445, pressure sensors 450, chamber airflow rate sensors 455, and other sensors mounted within chamber 405 and about and or proximate the workspace. The contemplated sensors are configured to detect respective parameters, such as a temperature and or an interior oxygen concentration of the inert atmosphere A within chamber 405 and about and proximate the workspace 410, work surface 415, and or workpiece WP.

Many types of temperature sensors or detectors are contemplated and can include atmospheric temperature sensors 440 that detect gas temperature, infrared sensors that detect temperature of objects located about work surface 415, such as workpiece WP and or trays placed on work surface 415 to capture frictionally heated tailings, turnings, shavings, and particulates cast off of workpiece WP during manufacturing, as well as temperature sensors 440 that can detect heat at other locations within chamber 405.

Many other types of sensors and or detectors are also contemplated, which can be mounted throughout chamber 405, and can include for example without limitation, atmosphere leak detectors, moisture sensors, sensors configured to detect existence of and or concentrations of certain gases, dust and particulate sensors, radioactive particle sensors, single frequency and or multispectral photonic sensors such as ultraviolet, x-ray, and gamma ray sensors, and many others. Each of such contemplated sensors can be utilized by fire suppression system 200 and subsystem 400 to trigger a variety of responsive actions, including actuation of the contemplated fire suppression capabilities of systems 200 and subsystems 400.

In further exemplary arrangements, and with continuing reference to the various figures and FIGS. 4, 5, and 6, the contemplated oxygen concentration sensor or sensors can be calibrated to detect and communicate an alert to system 200 and or subsystem 400 when the predetermined oxygen concentration equals and or exceeds a predetermined amount, such as for example 15%, in the interior atmosphere A in chamber 405 and or proximate the workpiece.

Upon detection, systems 200 and or 400 can be configured to actuate various responsive operations, such as adjusting and or increasing inert gas supply and or pressure to inert interior atmosphere A and or other operations directed to proactively suppressing potential issues arising from higher oxygen concentrations. Similarly, humidity and other gas, vapor, and or dust sensors can be employed to trigger certain actions.

Fire suppression subsystem 400 also contemplates and incorporates a dispenser 460, which is illustrated in enlarged view in FIG. 5 and in a partial section view in FIG. 6, coupled to chamber 405. Dispenser 460 is configured to discharge an antipyrophoric material AP into chamber 405, about workspace 410, and onto the workpiece WP. Dispenser 460 includes a hopper or storage receptacle 465 configured to store a predetermined quantity of an antipyrophoric material or materials AP. Receptacle or hopper 465 is sized to accommodate the volumetric and weight requirements of the predetermined quantity, and in some example can sized to accommodate a volumetric and weight requirement for 25 and or 50 kilogram predetermined quantity of antipyrophoric material AP, such as for example and without limitation MgO.

Receptacle 465 of dispenser 460 may further incorporate a top having a refill and or auto-refillable system or funnel F, and may also include an optionally preferred quick release top having latches L, and similar capabilities. In further variations, receptacle and or hopper 465 may include a bottom angled wall having a predetermined angle “a” (Greek letter alpha, depicted in FIGS. 5 and 6) suitable for use with a selected or required antipyrophoric material AP, such that during discharge operations, the flowable, granular materials are readily dispensed from receptacle 465 under force of gravity and or inert gaseous pressure therein.

Dispenser 460 also includes an actuatable valve 470, such as a solenoid controlled butterfly or gate valve 470, which is coupled with the hopper/storage receptacle 465. As depicted in FIGS. 5 and 6, valve 470 rotates about a shaft 470' that rotates in the geometric plane of the page of FIGS. 5 and 6, for applications using a rotating butterfly-type valve. Other configurations are contemplated for gate-type and other types of such valves 470. Fire suppression system 200 and or subsystem 400 actuates valve 470 to dispense the contemplated antipyrophoric material or materials AP.

Valve 470 supplies the material(s) to a manifold 475 that couples valve 470 to at least one and or one or more nozzles 480. Manifold 475 is configured, angled, and positioned to enable free, unobstructed flow under gravity and or pressure, of material(s) AP through manifold 475, towards nozzles 480. While perhaps unneeded for single nozzle arrangements, the exemplary dual nozzle 480 variation may include a manifold vane 485 that directs flow of material(s) AP during discharge to each nozzle 480. In the exemplary, two-nozzle 480 arrangement described here for purposes of illustration, but not limitation, manifold 475 incorporates a manifold angle q (Greek letter theta, FIGS. 5 and 6) that enables free flow of discharging material(s) AP from receptacle 465, through valve 470, about manifold vane 485, to and through nozzles 480, into work space 410, and onto work surface 415.

Such free flow of antipyrophoric material(s) AP is contemplated to occur upon actuation of valve 470, and under the force of gravity and or inert gas pressurization from gas supply source 490. Also contemplated but not shown, dispenser 460 may further optionally incorporate vibrators, agitators, and other components that are configured to and capable of metering, valving, and otherwise ensuring the required flow of discharged material(s) AP, during operation of system 200 and subsystem 400.

In various tests utilizing the exemplary MgO described elsewhere herein, it was discovered that valve 470 and manifold 475 internal diameters of about 3 to 5 inches and more preferably of about 4 inches enable free and unimpeded flow of the entire predetermined quantity of material(s) AP during discharge. Further, it was observed that nozzles 480 could be configured to have a height above the work surface 415 between about 24 and 48 and more preferably about 36 inches, and to have exit plane diameters of between about 2 inches and 4 inches, and more preferable about 3 inches, to enable discharge of the entire predetermine quantity of material(s) AP onto work surface 415 to form the contemplated antipyrophoric material, heat-sink and barriers APB, having suitable heights, radii, and saddles that covered the shaving, turnings, tailings, and particulates STP.

It was also discovered during such tests that a receptacle bottom wall angle a of between 40° and 60° degrees, and in some applications of about 55° enabled unimpeded and complete discharge of the entire predetermined quantity of material(s) AP therefrom, without tunneling, cohesive arching, rat-holing, caking, or other possible impediments. In these same tests, it was also discovered that a manifold angle q of between 40° and 60° and more preferably about 45° enabled free and unimpeded flow of the entire predetermined quantity of material(s) AP during operation, without internal piling, caking, or other undesirable impediments. Many other exemplary configurations are contemplated herein, and these examples will not and are not intended to limit to scalability of the many possible dispenser 460 configurations for various predetermined quantities of material(s) AP.

For the example two nozzle 480 configuration depicted, valve 470 rotates about shaft 470' to enable equal discharge of material(s) AP across manifold vane 485 and to each nozzle. Different configurations are contemplated for use with single and configurations of three or more nozzles 480. Each one or more nozzle(s) 480 are sized, positioned, angled, and or configured to discharge the antipyrophoric material on to and or about workspace 410 and or work surface 415, and or to cover workpiece WP.

Inert pressurize gas source 490 is coupled to hopper/receptacle 465 to supply pressurized, dry inert gas, such for example without limitation, nitrogen. Inert gas source 490 may be coupled to system 200 or another supply source to supply insert gas to dispenser, and may further be coupled to one or more emitters, such a high-velocity, low-pressure emitter 435 mounted within hopper/receptacle 465. In variations, the dry, inert supplied gas can prevent possible moisture intrusion into receptacle 465 to prevent caking and to otherwise preserve the integrity of antipyrophoric material(s) AP.

Further, insert gas source 490 may also ensure interior inert atmosphere A remains unadulterated by ambient external air, and continues to maintain a desired reduced concentration of oxygen during nominal storage of antipyrophoric material AP in dispenser 460, as well as during discharge operation when valve 470 opens. In variations, either inert pressurized gas source 490 and another inert pressurized gas source 495 may be coupled to one or more emitter(s) 435, to charge the interior inert atmosphere A of chamber 405, and source 495 may be similarly coupled to fire suppression system 200, another external source, and or a pressurized gas source proximate to fire suppression subsystem 400.

Fire suppression subsystem 400 and system 200 incorporate various communications capabilities, such as a wired communications network 500, and wireless communications components 505 such as WiFi(r), Bluetooth(r), NFC-near field communications, BACnet, and other communications capabilities. Such communications components 500, 505 can couple various components of system 200 and subsystem 400 together, and are configurable to enable communications with external systems, components, services, and personnel.

The disclosure contemplates that electronics and controls 245, 250, 250, 260, and FACP 265 are coupled by such communications components 500, 505 to temperature and oxygen concentration sensors 440, 445, pressure sensors 450, and airflow rates sensors 455, leak, gas, dust, and moisture sensors, and other types of sensors, as well as to dispenser 460, and controls for external gas supply sources such as at least one of gas solenoids 233, and high pressure tank nozzles 270, among others, for example without limitation.

With continued reference to FIG. 4, chamber 405 may also incorporate one or more access portals or windows 510, which may be formed upon walls 430, and may be sized, positioned, and configured to enable access to transfer items such as workpiece WP into chamber 405 and onto work surface 415. Although window 510 is depicted about a near facing surface of chamber 405, other locations are possible. An exhaust or vent fan assembly 515 may be included to exhaust the interior atmosphere, and a filter 520 may be incorporated as part of exhaust assembly 515, to prevent external venting of particulates or dust from internal atmosphere. The pressure of interior atmosphere A may be balanced during operation of fan 515 by supply of inert gas from emitters 435, and can be electronically controlled by various components of system 200 and or subsystem 400 described elsewhere herein.

The size, shape, position, and configuration of each such nozzle 480 can be adjusted to establish various shapes of piles of accumulated, discharged antipyrophoric material to accommodate various applications. As depicted in exemplary FIGS. 4, 5, 6, and 7 dispenser 460 is illustrated to have conical, circularly shaped configurations, but the disclosure contemplates rectangular pyramid, obloid, and many other shapes, which can adjust the configuration and arrangement of the discharged antipyrophoric material AP.

Exemplary FIG. 6 depicts dispenser 460 having valve 470 actuated by one or more of system 200 and subsystem 400, and discharging antipyrophoric material AP under into chamber 405 and onto nonflammable workspace 410, which material AP begins to form a barrier of the material APB, as it accumulates, piles, and eventually covers work surface 415 and or workpiece WP. Dispenser 460 discharges antipyrophoric material AP under one or more of force of gravity and or insert gas pressure source 490.

Figure 7:
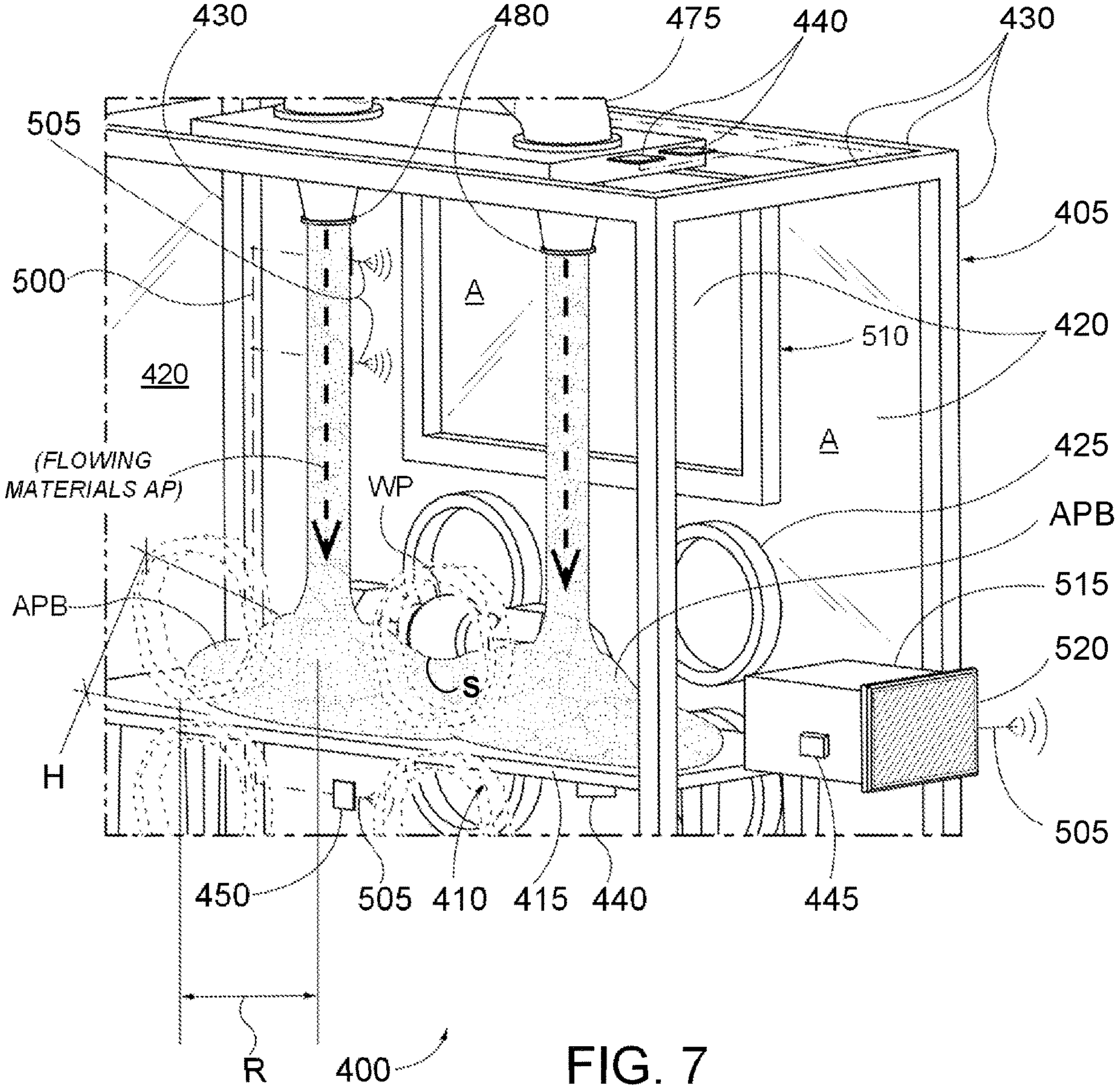
FIG. 7 is an enlarged, rotated detail view of FIG. 4 with certain structure removed and other elements shown in hidden lines for further illustration purposes, and is directed to additional components and elements of the system of the disclosure and the various other figures, and depicts certain operational capabilities of the preceding figures.

In FIG. 7, it may be understood that the antipyrophoric material AP is being discharged, flowing along vertical downward dashed lines shown along the direction flow, to establish a barrier and or heatsink cone or pile APB of accumulated material AP that covers a portion of workspace 410 and work surface 415. In corresponding FIG. 8, the predetermined quantity of antipyrophoric material(s) AP has been entirely discharged into work space 410, and onto work surface 415, establishing heat-sink and or barrier piles APB, and covering most and or all of workpiece WP, and shavings, tailings, turnings, and particulates STP. See, e.g., STP depcited in FIG. 4, which are shown covered by APB in FIGS. 7 and 8.

As may be understood by those with knowledge in the relevant fields of technology, certain types of pyrophoric materials are susceptible to auto ignition under certain circumstances and conditions, and are especially prone during subtractive manufacturing that generates frictional heat as the cast off shavings, tailings, turnings, and particulates STP are generated.

The contemplated predetermined quantity, antipyrophoric material or materials AP, is adjusted to accommodate a particular application, work surface 415, workpiece WP, and other application and operational characteristics of fire suppression subsystem 400 and components thereof. As contemplated herein, antipyrophoric material(s) AP are materials that are compatible for use with pyrophoric materials such as the contemplated pyrophoric workpiece WP.

For purposes of example and without limitation, such pyrophoric materials react with air (most often oxygen contained in air), or with moisture in air. Pyrophoric reactions that typically occur spontaneously and without an ignition source are oxidation and hydrolysis. In some circumstances, heat generated by such reactions may become an ignition source and or cause such pyrophoric materials to ignite.

Further, in still other circumstances, such reactions may release and or liberate flammable gases, which can in turn serve as an ignition source and or increase the likelihood of ignition. Examples of pyrophoric materials should be known to those having skill in the related fields of technology, and can include without limitation, pyrophoric alkyl metals and derivatives, carbonyl metals, metal sulphides, alkyl nonmetals, alkyl non-metal halides, alkyl non-metal hydrides, combinations thereof, and pyrophoric dust, shavings, turnings, tailings, and particulates STP of such materials, and others.

In further examples, fire suppression systems 200 and subsystems 400 also contemplate use with certain of such exemplary pyrophoric materials, and include for example without limitation, aluminum-mercury, bismuth-plutonium, caesium, calcium, cerium, chromium, cobalt, copper-zirconium, hafnium, iridium, iron, lead, lithium, manganese, nickel, nickel-titanium, palladium, platinum, plutonium, potassium, rubidium, sodium, tantalum, thorium, titanium, uranium, zirconium, and others. With these examples in mind, attention is invited to applications of fire suppression systems 200 and subsystems 400 for use with such metals, including for example, uranium and plutonium workpieces WP, wherein it is known to some having skill in the art that antipyrophoric materials AP such as magnesium oxide (hereafter also sometimes referred to as "MgO") is/are compatible for use according to the principles of the disclosure.

More specifically, the instant disclosure contemplates use of such contemplates antipyrophoric materials AP in a granular or sand-like form of MgO, which may incorporate one or more stability and anticaking agents. In these exemplary arrangements, the MgO sand is preferably or alternatively formed to have a MgO concentration by volume exceeding about 95%, and to incorporate one or more anti-caking and other agents that may include de minimus amounts of oxides of silicon, calcium, iron, and or aluminum cumulatively amounting to less than about 5% in total and about less than between 0.3% and 1.1% each. Exemplary MgO materials are available from many suppliers and manufacturers, and one exemplary variant is available from Martin Marietta Magnesia Specialties, Baltimore, Maryland, USA.

Such contemplated MgO granular antipyrophoric materials and sands AP will typically have a preferred granulometry ranging between about 4 and 325 mesh. Mesh measurements are typically used in connection with such contemplated granular materials are generally known by those skilled in the art to convert to comparable and approximately particle-average diameters or means sizes. For example, approximately 4 mesh can be converted and or equivalent to about an average sand or material particle size of about 0.187 inches, 4.76 millimeters, or 4,760 microns, or more or less.

Similarly, approximately 325 mesh means the contemplated sand or granular antipyrophoric material is powdered and has an average approximately particle size of about 0.0017 inches, 0.044 millimeters, or 44 microns, or more or less. In further variations, the contemplated MgO antipyrophoric material also preferably or alternatively has an angle of repose approximately between 20% and 40%+/−2%. In such examples, the angle of repose is meant to define how such an antipyrophoric material accumulates into a pile on or about work surface 415 to form antipyrophoric barrier APB, when discharged from dispenser 460 during operation of fire suppression systems 200 and subsystems 400.

During operation, as exemplified in FIGS. 6 and 7 among others, even though manual operation is possible as needed, fire suppression systems 200 and subsystems 400 automatically actuate dispenser 460 to discharge antipyrophoric material AP proximate workspace 415 and or workpiece WP, responsive to automated detection of at least one of a predetermined temperature, an oxygen concentration, and or other environmental, atmospheric, and other parameters and conditions as may be required for a desired fire suppression exigency and or prophylactic application of antipyrophoric material AP.

With continuing reference to the various figures and especially to FIGS. 6 and 7, the disclosure contemplates fire suppression applications of subsystem 400 wherein the granular antipyrophoric material AP is discharged in the predetermined quantity, which predetermined quantity if selected and adjusted to establish at least one or one or more of the barrier and or pile APB of antipyrophoric material AP. The contemplated APB is sized, shaped, and positioned to operate as a heat sink, formed to be sufficient to reduce the predetermined temperature proximate workpiece WP and or shavings, tailings, turning, and particulates STP.

The APB is also sized, shaped, and positioned to be and or operate as an oxygen and or gas barrier that covers and or surrounds workpiece WP and its STP. In variations, the illustrative or exemplary APB forms a substantially conical pile having a predetermined substantially vertical height H and substantially horizontally extending radius R (See, e.g., FIG. 7) on top of and around workpiece WP. In some applications, as may be understood from FIGS. 7 and 8, radius R may be equal to height H.

Figure 8:
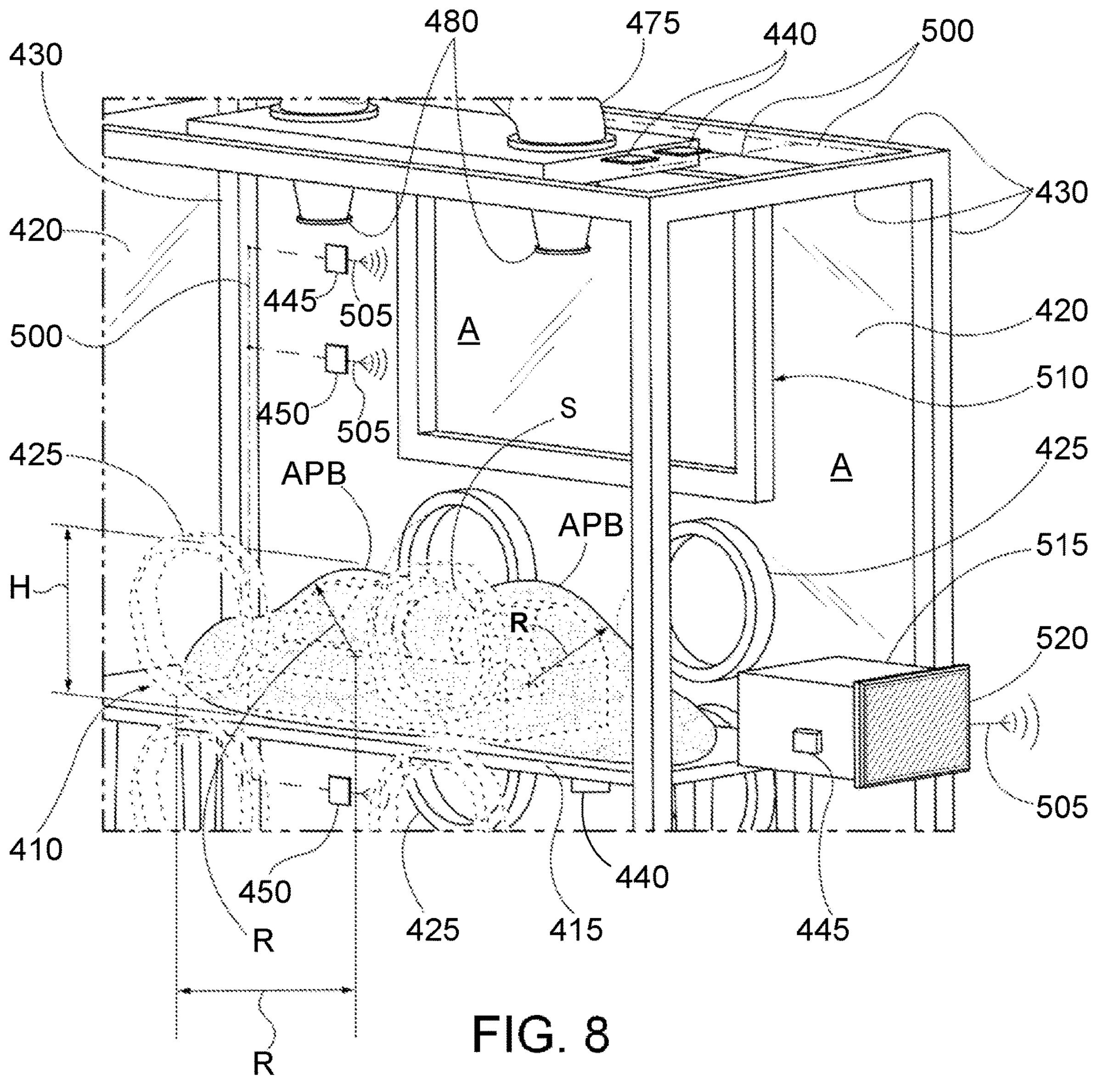
FIG. 8 is an enlarged, rotated detail view similar to FIG. 7 with certain structure removed and other elements shown in hidden lines for further illustration purposes, depicts additional aspects of the disclosure and the system and components of FIGS. 4 and 7.

In applications having more than one nozzle 480, after discharge, APBs may be configured to form a saddle S between overlapping two or more such APBs. Other configurations of the notionally contemplated APB may be designed to form other shapes, heights H, radii R, and saddles S covering and formed around work surface 415, and workpiece WP and STPs. Although two conical nozzles 480 are depicted herein, one or many such nozzles 480 are contemplated, in a variety of possible shapes, positions, and configurations. As depicted in FIGS. 7 and 8, those skilled in the relevant arts may be able to comprehend that heat-sink/barrier APB is depicted covering workpiece and associated tools and machinery, the latter of which are shown in dashed lines to illustrate their position beneath the APB and saddle S after discharge of the predetermined quantity of material(s) AP.

Further variations contemplate the fire suppression system 200 and or subsystem 400 having a cabinet 205 that includes a plurality of environmentally isolated compartments 210, 215, 240, with a first walled compartment 210 for receiving and mounting a plurality of fire suppression control systems including at least one of electrical components and controls 245, 250, 250, 260, and FACP 265, coupled with temperature and oxygen concentration sensors 440, 445, pressure sensors 450, and airflow rates sensors 455, and other sensors, and dispenser 460, and controls for at least one of gas solenoids 233, high pressure tank nozzles 270, and gas emitter 435 coupled to the chamber 405.

When the sensors and or detection devices 440, 445, 450 detect an event that is predetermined to trigger a fire suppression response, a set of contact closures and or controls 245, 250, 250, 260 will start a chain of responsive events. Such events may include triggering remote alarms in local and off site or manned supervisory stations, which will receive alerts and or annunciations from FACP 265. The panel will energize solenoid 233 to, for example, enable high pressure gas to open pilot bottle valves 270 on tanks 230, or another external inert gas source, to allow gas to flow to the panel.

At that time, one or more of electronics and controls 245, 250, 250, 260 of system 200 and or subsystem 400 will signal an end drive solenoid 233 to rotate and control a connected needle valve or a pressure reducing device to maintain and to adjust the amount of gas to be delivered to chamber 405 as appropriate. In other exemplary applications of system 200 and or subsystem 400 wherein water may be utilized, a water solenoid opens and pressurized water flows to an emitter, such as for example stand-alone, cabinet 205-mounted emitter(s) 285, in combination with the gas, and the combination is educted, emulsified, and a fine mist is created to suppress the alarmed fire suppression event.

While exemplary arrangements and configurations are described above, it is not intended that these describe all possible forms of the disclosure and fire suppression apparatus and systems 200, and subsystems 400. Rather, the words used in the specification are words of example and description rather than limitation, and it is understood that various changes may be made without departing from the spirit and scope of the disclosure. Additionally, the features of various exemplary configurations and arrangements may be combined to form further variations and modifications of the disclosure.

The invention claimed is:

1. A fire suppression system, comprising:

a chamber configured to maintain an interior inert atmosphere and to enclose and establish a nonflammable workspace for a pyrophoric workpiece;

the chamber further configured as a glove box having viewing windows and a plurality of sealed glove ports positioned to enable user manipulation of the workpiece about the workspace;

a temperature sensor mounted proximate the workspace;

an oxygen concentration sensor configured to detect an interior oxygen concentration of the atmosphere; and a dispenser coupled to the chamber and comprising a hopper and antipyrophoric material stored in the hopper, the dispenser configured to discharge the antipyrophoric material onto the workpiece responsive to automatic detection proximate the workpiece of at least one of a predetermined temperature and oxygen concentration.

2. The system of claim 1, further comprising:

the inert atmosphere maintained with an interior pressure supplied from a nitrogen source and to have a volumetric oxygen concentration less than 15%; and the predetermined oxygen concentration equals or exceeds 15%.

3. The system of claim 1, wherein:

the antipyrophoric material is a magnesium oxide sand formed to have a granulometry of between 4 and 6 mesh and an angle of repose between 25% and 35%, and which is at least 45% magnesium oxide.

4. The system of claim 1, wherein:

the antipyrophoric material is discharged in a predetermined quantity configured to establish at least one of:

(a) a heat sink sufficient to reduce the predetermined temperature proximate the workpiece; and (b) an oxygen barrier surrounding the workpiece.

5. A fire suppression system, comprising:

a chamber configured to maintain an interior inert atmosphere and to enclose and establish a nonflammable workspace for a pyrophoric workpiece;

the chamber configured as a glove box having viewing windows and a plurality of sealed glove ports positioned to enable user manipulation of the workpiece about the workspace;

a temperature sensor mounted proximate the workspace;

an oxygen concentration sensor configured to detect an interior oxygen concentration of the atmosphere;

a dispenser configured to discharge an antipyrophoric material onto the workpiece responsive to automatic detection proximate the workpiece of at least one of a predetermined temperature and oxygen concentration;

the chamber including a cabinet containing a plurality of environmentally isolated compartments;

a first walled compartment for receiving and mounting a plurality of fire suppression control systems including at least one of electrical components coupled with the temperature and oxygen concentration sensors and the dispenser, and controls for at least one of (a) gas solenoids, (b) high pressure tank nozzles, and (c) a gas emitter coupled to the chamber; and a second walled compartment having high pressure gas components and including solenoid and actuator systems, and configured to isolate gas therein by a sealing mechanism disposed in an opening between the first and second walled compartments.

6. The system of claim 5, further comprising:

the inert atmosphere maintained with an interior pressure supplied from a nitrogen source and to have a volumetric oxygen concentration less than or equal to 15%; and the predetermined oxygen concentration exceeds 15%.

7. The system of claim 5, further comprising:

the antipyrophoric material is a magnesium oxide sand formed to have a granulometry of between 4 and 6 mesh and an angle of repose between 25% and 35%, and which is at least 45% magnesium oxide.

8. The system of claim 5, further comprising:

the antipyrophoric material is discharged in a predetermined quantity configured to establish at least one of:

(a) a heat sink sufficient to reduce the predetermined temperature proximate the workpiece; and (b) an oxygen barrier surrounding the workpiece.

9. The system of claim 1, wherein the dispenser further comprises a valve configured to open to discharge the antipyrophoric material onto the workpiece.

10. The system of claim 9, wherein the valve is a solenoid controlled butterfly or gate valve.

11. The system of claim 9, wherein the hopper is positioned above the chamber and the valve is positioned between the hopper and the chamber, and wherein the antipyrophoric material is pulled through the valve by gravity when the valve is opened.

12. The system of claim 9, wherein the dispenser further comprises communications components connecting the temperature sensor and the oxygen concentration sensor in communication with a controller of the valve.

13. The system of claim 1, wherein the dispenser further comprises an inert gas source coupled to the hopper.

14. The system of claim 1, wherein the dispenser further comprises a manifold and a nozzle, the manifold connects the hopper to the nozzle, and the nozzle is positioned within the chamber.

* * * * *